Figures 1, 2:
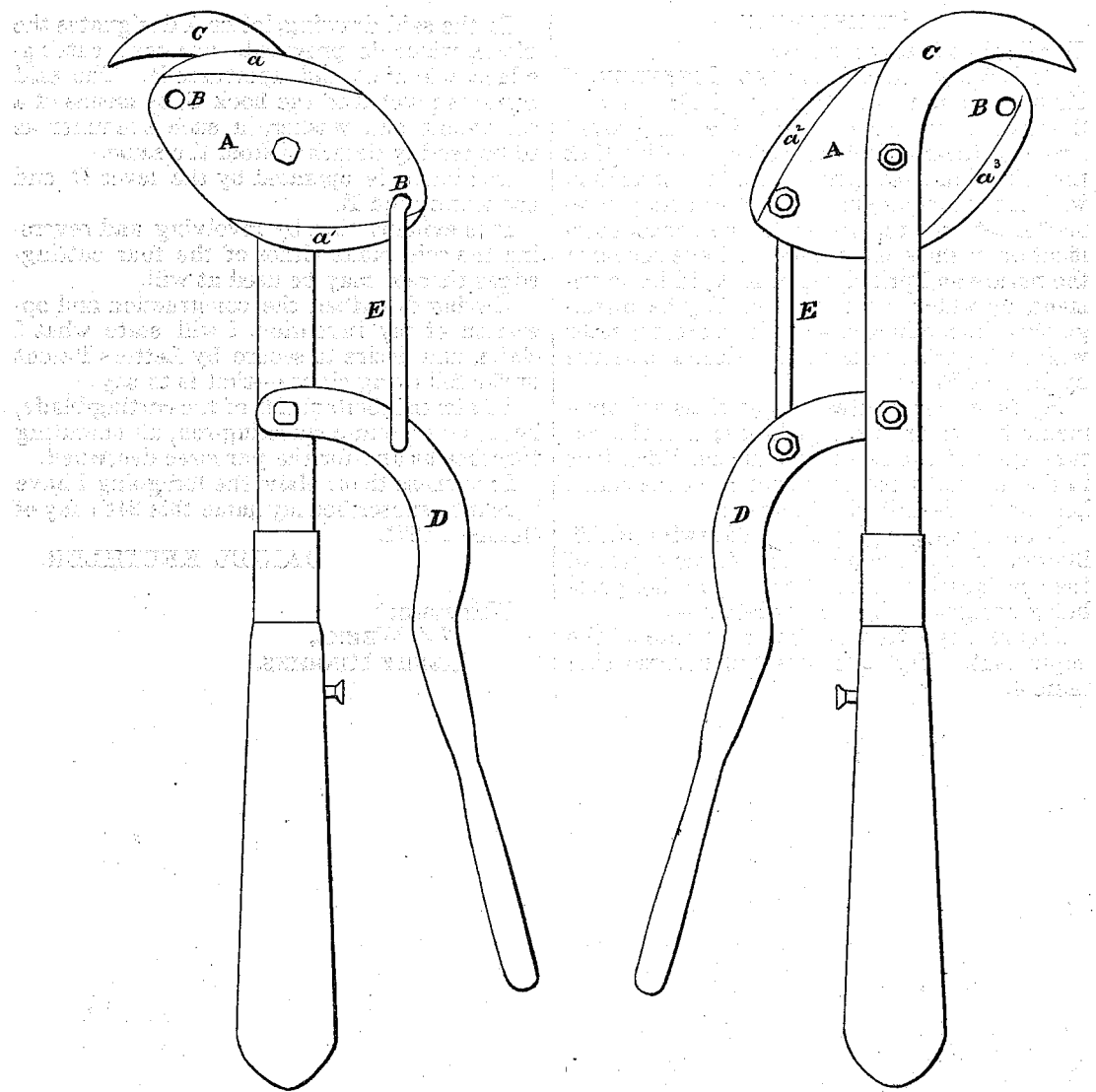

DANIEL KEETHLER.

Improvement in Pruning-Shears.

No. 126,888. Patented May 21, 1872.

Witnesses:
H. A. Daniels
George H. Howard

Daniel Keethler, Inventor,
Chas S. Whitman, Attorney

UNITED STATES PATENT OFFICE.

DANIEL KEETHLER, OF MOUNT ORAB, OHIO.

IMPROVEMENT IN PRUNING-SHEARS.

Specification forming part of Letters Patent No. 126,888, dated May 21, 1872.

SPECIFICATION.

*To all whom it may concern:*

Be it known that I, DANIEL KEETHLER, of Mount Orab, in the county of Brown and State of Ohio, have invented an Improved Pruning-Shears; and do hereby declare that the following description, taken in connection with the accompanying plate of drawing, hereinafter referred to, forms a full and exact specification of the same, wherein I have set forth the nature and principles of my said improvement, by which my invention may be distinguished from others of a similar class, together with such parts as I claim and desire to secure by Letters Patent.

My invention relates to that class of implements known as pruning-shears; and the nature thereof consists in certain modifications in the details of the construction of the same, hereinafter described and shown.

In the accompanying plate of drawing, which illustrates my invention and forms a part of the specification thereof, corresponding parts being designated by similar letters—

Figure 1 is a view of the front side of the implement. Fig. 2 shows the reverse side thereof.

In the said drawing, letter A designates the blade, which is provided with four cutting-edges, $a$ $a^1$ $a^2$ $a^3$, and apertures B. The said blade is pivoted to the hook C, by means of a screw-bolt and washer, in such a manner as to be readily detached from the same.

The blade is operated by the lever D and connecting-rod E.

It is evident that by revolving and reversing the said blade either of the four cutting-edges thereof may be used at will.

Having described the construction and operation of my invention, I will state what I claim, and desire to secure by Letters Patent in the following clause—that is to say:

I claim the combination of the cutting-blade, hook, lever, and connecting-rod, all operating together as and for the purposes described.

In witness that I claim the foregoing I have hereunto subscribed my name this 24th day of October, 1871.

DANIEL KEETHLER.

Witnesses:
 WM. WEEKS,
 HENRY HUGGINS.